R. EBERLE,

Assignor to C. J. HALEY.

Stocking-Supporter Clasp.

No. 8,522. Reissued Dec. 17, 1878.

Attest:

William Paxton

Courtney A. Cooper

Inventor

Rachel Eberle

By her atty

C. E. Wilson

UNITED STATES PATENT OFFICE.

RACHEL EBERLE, OF NEW YORK, N. Y., ASSIGNOR TO CHRISTINA J. HALEY.

IMPROVEMENT IN STOCKING-SUPPORTER CLASPS.

Specification forming part of Letters Patent No. 155,863, dated October 13, 1874; Reissue No. 8,522, dated December 17, 1878; application filed September 27, 1878.

*To all whom it may concern:*

Be it known that I, RACHEL EBERLE, of the city, county, and State of New York, have invented Improvements in Stocking-Supporters, of which the following is a specification:

This invention relates to the clasp which is used for connecting the stocking to the suspension band or strap of a stocking-supporter.

Figure 1:
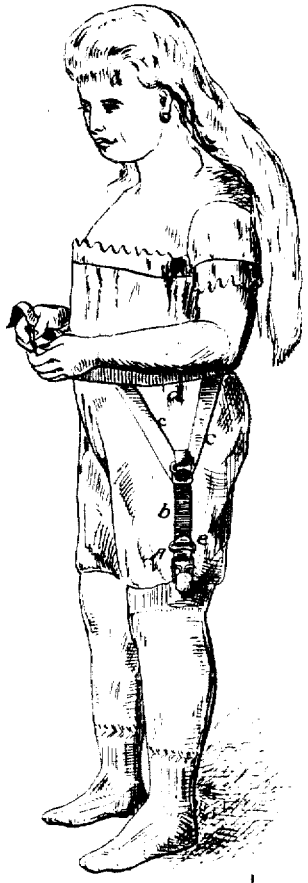
Figure 3:
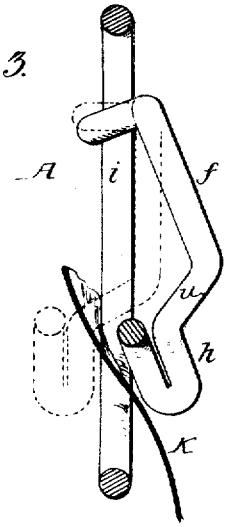
Figure 4:
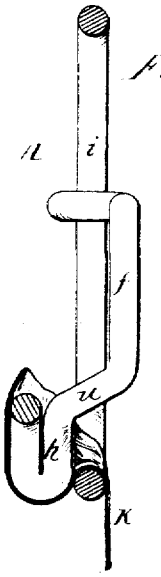
Figure 2:
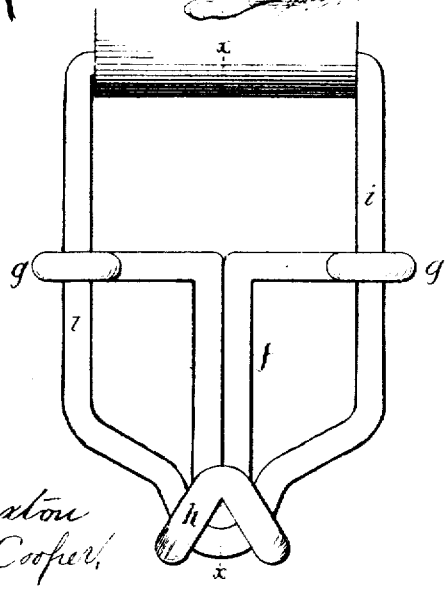

In the accompanying drawing, which forms part of this specification, Figure 1 illustrates a stocking-supporter with my improvement; Fig. 2, a front view of the device enlarged; Figs. 3 and 4, sections on the line *x x*, Fig. 2, showing the parts in different positions.

*i* is a loop, constructed to form a throat contracted at the lower end, and supported by the suspension-strap *b*, connected to the waistband or belt *d* of the supporter.

*h* is a knob or head, which has a shank or neck, *u*, and is supported by a carrier, *f*, constituting a means for connecting the loop and head *d* in the supporter to permit their co-operation in securing the stocking, as hereinafter set forth.

The carrier is provided with lateral arms, which clasp the sides of the loop, so that it may be adjusted to the positions hereinafter described. When the headed device is carried to the position shown in Fig. 3, the top of the stocking may be drawn between the head and the loop, and when the head is brought to the position shown in dotted lines, and carried longitudinally downward toward the throat, the stocking will be folded over the head, and will be carried downward and folded in the throat under the neck *u*, so that any downward pull upon the stocking will only draw it the closer over the head, force the neck more firmly upon the portion in the throat, and secure a better hold.

It will be seen that these operations are quickly performed, and that by elevating the head from the throat the stocking may be instantly detached.

The suspension-strap may be shortened or lengthened by means of an adjusting-slide, *x*.

I claim—

1. In a stocking-supporter, the loop *i*, constructed to form a throat, and the head *h*, the two being connected in the supporter to permit the head to be passed in a vertical line to and from the throat, substantially as set forth.

2. The combination, in a stocking-supporter, of a loop having an opening contracted at the lower end and a carrier supporting a head having a neck, *u*, and connected to the loop, substantially as and for the purpose set forth.

3. The combination, in a stocking-supporter, of a loop contracted to form a throat, a head, *h*, and means by which the head may be adjusted in a vertical line to and from the throat, substantially as specified.

In testimony whereof I have signed my name to this specification in the presence of two subscribing witnesses.

RACHEL EBERLE.

Witnesses:
J. P. LINDSAY,
S. VAN ZANDT.

Correction of Reissued Letters Patent No. 8,522.

It is hereby certified that at the time Reissued Letters Patent No. 8,522 were granted to Christina J. Haley as assignee of Rachel Eberle, December 17, 1878, for an improvement in Stocking Supporter Clasps, there was on record in this Office (Liber 123, page 219,) an assignment from said Christina J. Haley of one-half of her interest to Lucien C. Warner, and that the patent should have been issued to said Warner jointly with the said Haley mentioned therein; that the correction has been made in the file and records relating to the case in this Office, and is hereby made in said Letters Patent to make the title therein conform to the records of this Office.

Signed, countersigned, and sealed this 18th day of January, A. D. 1881.

[SEAL.]

A. BELL,
*Acting Secretary of the Interior.*

Countersigned:

E. M. MARBLE,
*Commissioner of Patents.*